United States Patent [19]

Hentzschel et al.

[11] 4,333,098

[45] Jun. 1, 1982

[54] PROCESS FOR THE THREE STEP-MULTIPLEX CONTROL OF ELECTRO-OPTICAL DISPLAY ARRANGEMENTS AND CIRCUIT FOR EFFECTUATING THE PROCESS

[75] Inventors: Hans Hentzschel; Soni-Enrico Ludwig, both of Munich, Fed. Rep. of Germany

[73] Assignee: Eurosil GmbH, Munich, Fed. Rep. of Germany

[21] Appl. No.: 201,151

[22] Filed: Oct. 27, 1980

[30] Foreign Application Priority Data

Oct. 26, 1979 [DE] Fed. Rep. of Germany ....... 2943339

[51] Int. Cl.$^3$ ............................................... G06F 3/14

[52] U.S. Cl. .................................... 340/805; 340/765

[58] Field of Search ................ 340/166 EL, 758, 765, 340/771, 802, 803, 805

[56] References Cited

U.S. PATENT DOCUMENTS 4,019,178 4/1977 Hashimoto et al. ................ 340/805

4,099,073 7/1978 Hashimoto et al. ................ 340/805

*Primary Examiner*—Alvin H. Waring

*Attorney, Agent, or Firm*—Scully, Scott, Murphy & Presser

[57] ABSTRACT

A process for the three step-multiplex control of electro-optical display arrangements having segment-like forward and back electrodes, through the intermediary of periodic pulse sequences which have six pulses within each control period, which can presently assume four different voltage levels. Three of these pulse sequences are constantly applied to the back electrodes and the additional pulse sequences, in accordance with the measure of the display which is to be represented, are applied to the forward electrodes. The invention further includes a circuit for effectuating the process for the three step-multiplex control.

9 Claims, 15 Drawing Figures

PROCESS FOR THE THREE STEP-MULTIPLEX CONTROL OF ELECTRO-OPTICAL DISPLAY ARRANGEMENTS AND CIRCUIT FOR EFFECTUATING THE PROCESS

BACKGROUND OF THE INVENTION

1. Field of the Invention

The present invention relates to a process for the three step-multiplex control of electro-optical display arrangements having segment-like forward and back electrodes, through the intermediary of periodic pulse sequences which have six pulses within each control period, which can presently assume four different voltage levels, and wherein three of these pulse sequences are constantly applied to the back electrodes and the additional pulse sequences, in accordance with the measure of the display which is to be represented, are applied to the forward electrodes. The invention further relates to a circuit for effectuating the process for the three step-multiplex control.

For the control of liquid crystal display arrangements it is necessary that the display segments thereof be operated with alternating current since, otherwise, the life expectancy of the displays is extensively reduced. This requirement renders more difficult a multiplex control of liquid crystal displays and leads to a considerable increase in its circuitry requirements.

2. Discussion of the Prior Art

In a data sheet of the firm Shinshu Seiki Co. Ltd., dated July 15, 1977, under the heading "Specifications for Liquid Crystal Display LD-316", and in the periodical "Electronics" of July 5, 1979, page 141 under the title "Three-line multiplexing cut pin count of complex LCDs" by L. T. Reiss, there was disclosed a three step-multiplex control process which operates with four voltage levels and which evidences pulse sequences which are periodic step functions. For the control of displays, in particular of seven-segment displays, eight different pulse sequences are necessary for this process. Hereby, it is disadvantageous that for the generation of each pulse sequence it is necessary to provide a special switching circuit, which requires a significant manufacturing demand. In the utilization of microprocessors for the generation of the pulse sequences, this multiplicity of different pulse sequences leads to correspondingly high programming and storage requirements.

SUMMARY OF THE INVENTION

In recognition of the fact that for the production of monolithic pulse generating circuits there is to be preferred the utilization of functional groups which are the same relative to each other, the invention has as its object the development of a three step-multiplex control process of the above described type, which requires the least possible number of different pulse sequences.

For the representation of an indicia, for example, a numeral with a seven-segment display, there are accordingly required only four different pulse sequences, which substantially reduces the requirement for the development of the monolithic circuit.

Whereas the five forward electrode pulse sequences facilitate a representation of numerals, for instance, in a seven-segment display, for the representation of special indicia, for example, a point, sign digit and so forth, additional pulses sequences are necessary. Inventively, these additional forward electrode pulse sequences can be drawn off from the back electrode pulse sequences through a phase displacement by one-sixth of the control period, which signifies a further advantage in connection with the inventive object.

Furthermore, pursuant to the invention, there is also provided the advantageous capability of realizing a signal preparation circuit through a programmable storage logic control. As a programmable storage circuit that can be utilized a microprocessor which rhythmically transmits the data serially or in parallel to the logic circuit. Inventively, in a serial control there is provided a shift register at the input of the logic circuit which converts the series data into parallel data.

In a non-programmable storage, but connecting programmable realization of the signal preparation circuit, there is in particular, provided the capability that logic information processing operations can be coupled into the control cycle for the display whereby such a version, as is known, allows for higher operating speeds. Furthermore, it is advantageous that this circuit consists of circuit elements which can be integrated in an energy-saving CMOS technology.

Pursuant to the invention, there is also achieved a fixed-phase coupling of all operational units in an advantageous manner through a synchronizing oscillator and a frequency divider which is connected to the output of the oscillator.

A further advantage in the monolithic integration is provided through the capability that it is possible to save on OR interconnections through the above measures. For the generation of each of the four different pulse sequences there serve four different pulses generating switching circuits, so that there is simplified the production of monolithic switching circuits.

BRIEF DESCRIPTION OF THE DRAWINGS

Reference may now be had to the following detailed description of the inventive process as well as to preferred exemplary embodiments of the invention, taken in conjunction with the accompanying drawings; in which.

DETAILED DESCRIPTION

The representation relates to segment displays wherein each segment S is optically activated through control of the forward electrode and of the back electrode.

Figure 1:
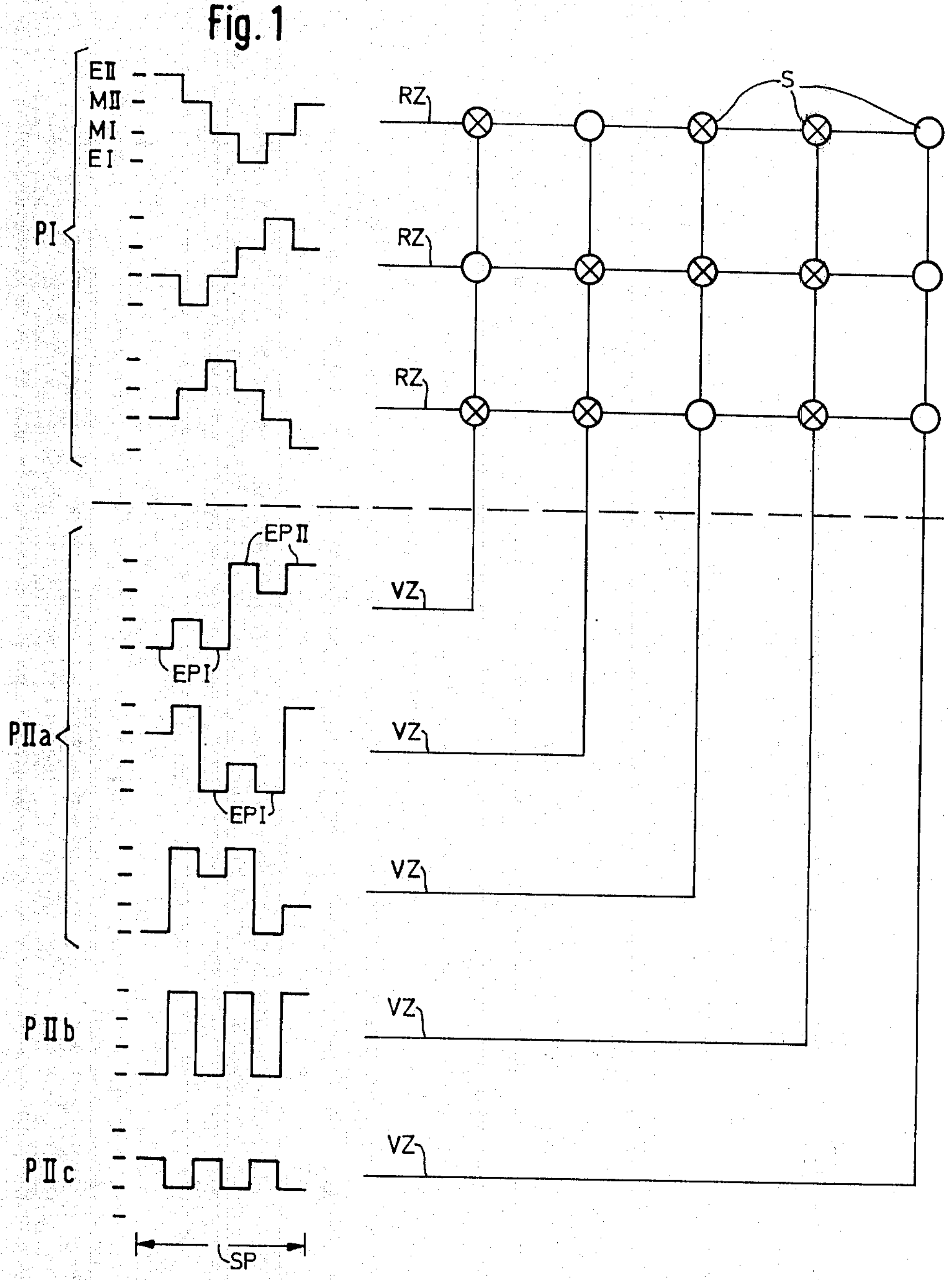
FIG. 1 illustrates eight pulse sequences for the control of a seven-segment numerical display.

FIG. 1 illustrates eight pulse sequences required for the display of a seven-segment numeral, which evidence four different voltage levels whereby there occur two extreme levels designated with EI and EII and two median levels designated with MI and MII. The length of the illustrated pulse sequences corresponds in time interval to a control period SP and is subdivided into six equal parts. Each two adjoining voltage plateaus lie apart about ⅓ of the maximum voltage which is obtained from difference between the two extreme levels EI and EII. Three back electrode pulse sequences PI supply power through three input conductors RZ to a plurality of back electrodes RE (see FIG. 11) of segments S. Deactuated segments are identified through an open circle, and actuated segments S additionally with a cross. Each one of at least five forward electrode pulse sequences PI controls the forward electrodes VE (see FIG. 11) through forward electrode input conductors VZ of segment S which are powered by three different back electrode pulse sequences PI.

Figure 2:
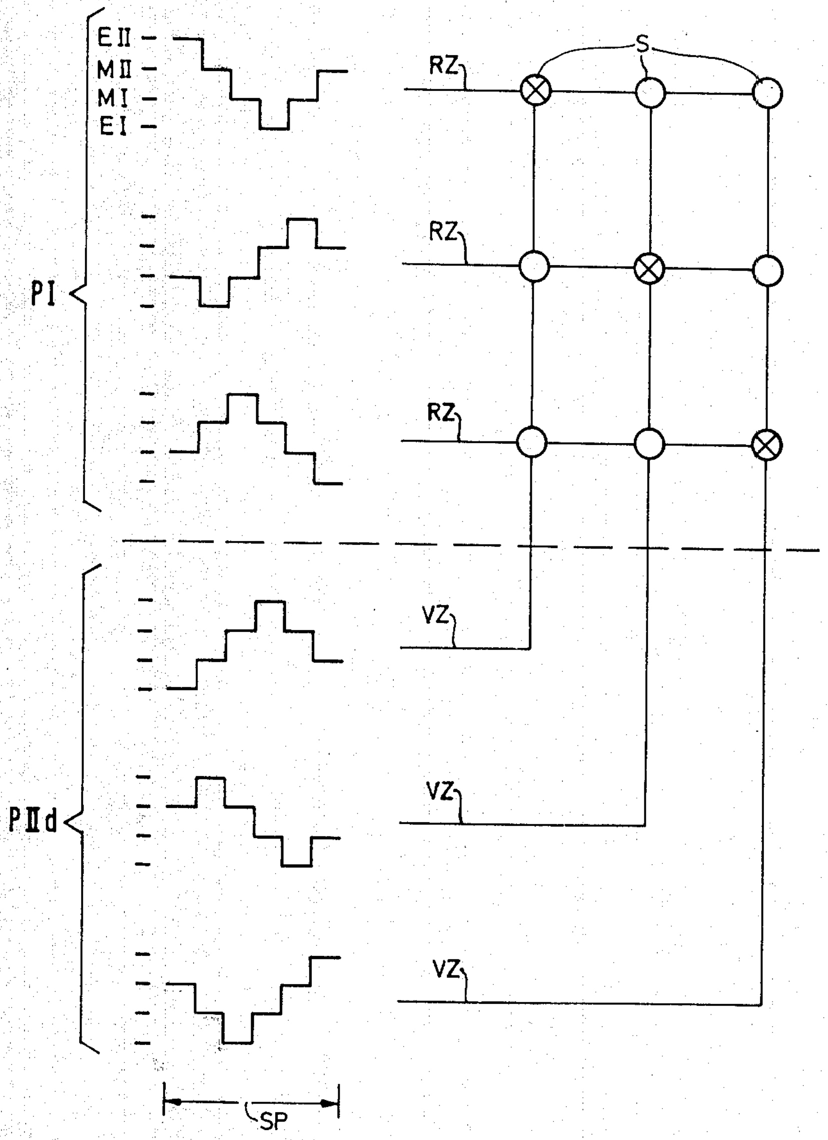
FIG. 2 illustrates further pulse sequences for the generation of special indicia.
Figure 12:
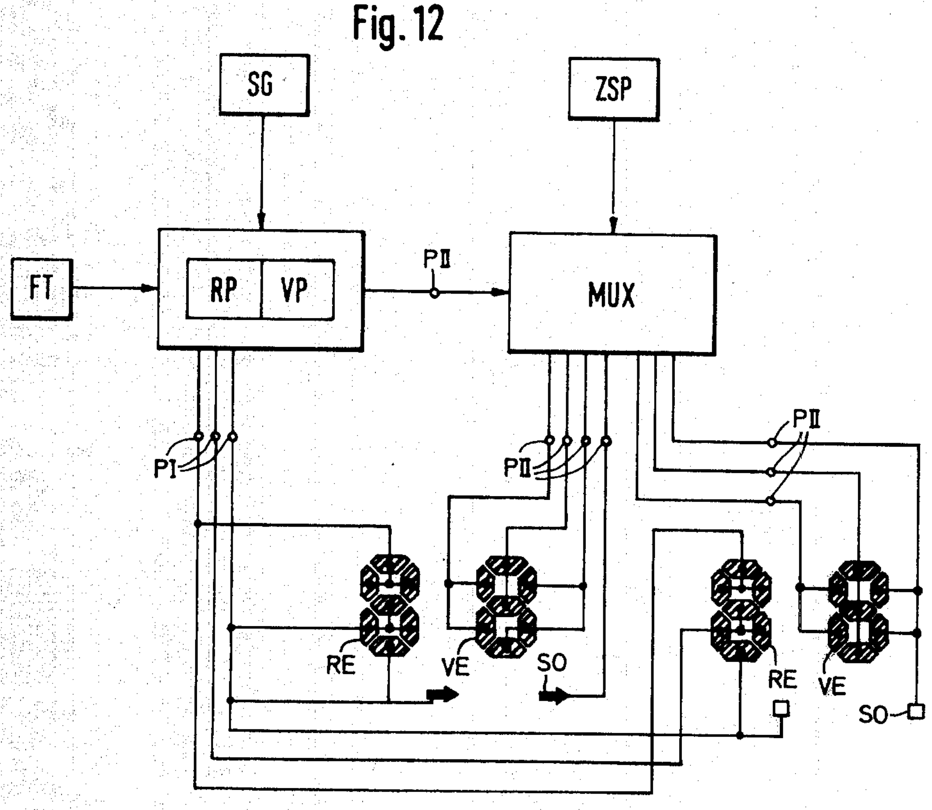
FIG. 12 is a repesentation pursuant to FIG. 11 with special indicia.

Indicated in FIG. 2 are three additional forward electrode pulse sequences PIId which, together with those pursuant to FIG. 1, can be utilized for the formation of special indicia SO (see FIG. 12).

The effective voltage which is applied to a liquid crystal, according to the above indicated literature, is calculated as the quadratic median value of the voltage differential which is applied between two oppositely located segment electrodes. In order to achieve a high contrast it is advantageous when the effective voltage ratio between the actuated and deactuated condition is as high as possible. This relationship has, in the inventive process, a value of 1.915. A usual liquid crystal display (LCD in FIG. 3) evidences an effective threshold voltage value of approximately one volt so that, for effective voltages which lie below this value, the display is switched off, whereas with an increasing effective voltage above this value, the contrast increases quite rapidly. Therefore, when the voltage level EI, MI, MII and EII is selected so that the effective maximum voltage consists of about 1.8 volts, there is then obtained a liquid crystal display which is rich in its contrast.

Figure 3:
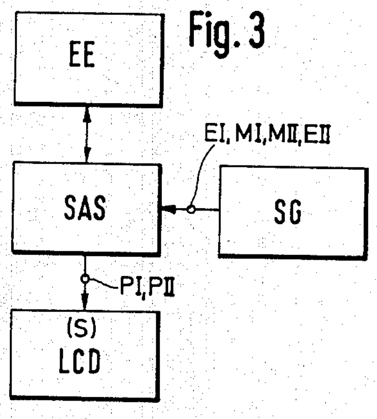
FIG. 3 is a circuit block diagram for the effectuation of the process.

Illustrated in FIG. 3 is the principal construction of a three step-multiplex control circuit. An input unit EE forms the information which is to be represented into a binary voltage level, which is interrogated through synchronizing pulses of a signal preparation circuit SAS. The signal preparation circuit SAS is connected with a voltage generator SG which generates the four voltage levels EI, MI, MII and EII. The signal preparation circuit SAS, in accordance with the information which is to be represented now controls the segments S of the liquid crystal display LCD. Hereby, the same back electrodes RE (see FIG. 11) for each indicia of a display LCD encompassing a plurality of indicia are connected with each other and commonly controlled through a predetermined pulse sequence of the three back electrode pulse sequences PI. For the representation of a predetermined indicia sequence, the forward electrodes VE (see FIG. 11) of the different indicia are controlled with predetermined pulse sequences of the forward electrode pulse sequences PII, as is described in the above-mentioned literature in connection with other pulse sequences.

Figure 4:
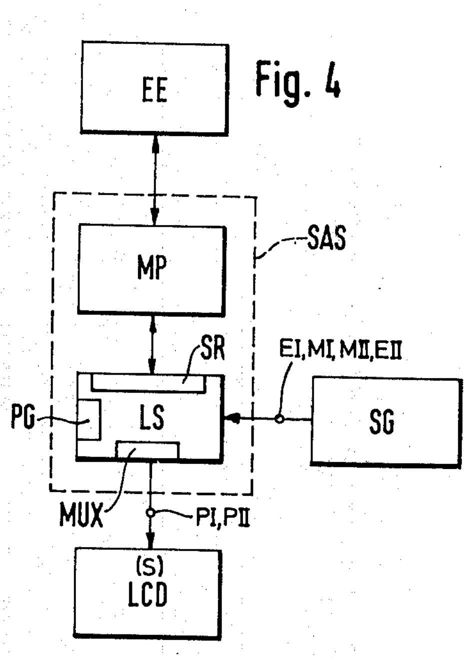
FIG. 4 is a circuit block diagram of a control circuit which includes a programmable storage circuit and a logic circuit pursuant to a first embodiment of the invention.

In FIG. 4 the signal preparation circuit SAS consists of a programmable storage circuit MP, for example, a microprocessor, which is connected with a logic circuit LS which, in turn, is powered by the voltage generator SG. The microprocessor again rhythmically interrogates the information which is to be represented from the input unit VE, for example, a multidigit numeral, and transmits this further to the logic circuit LS. The data transmission preferably takes place serially. The logic circuit LS converts the serial data into parallel data through a shift register SR. The logic circuit LS particularly includes a pulse generator PG which generates the forward and back electrode pulse sequences PII and PI, and a multiplexer MUX whose function is more closely explained in connection with FIG. 5.

Figure 5:
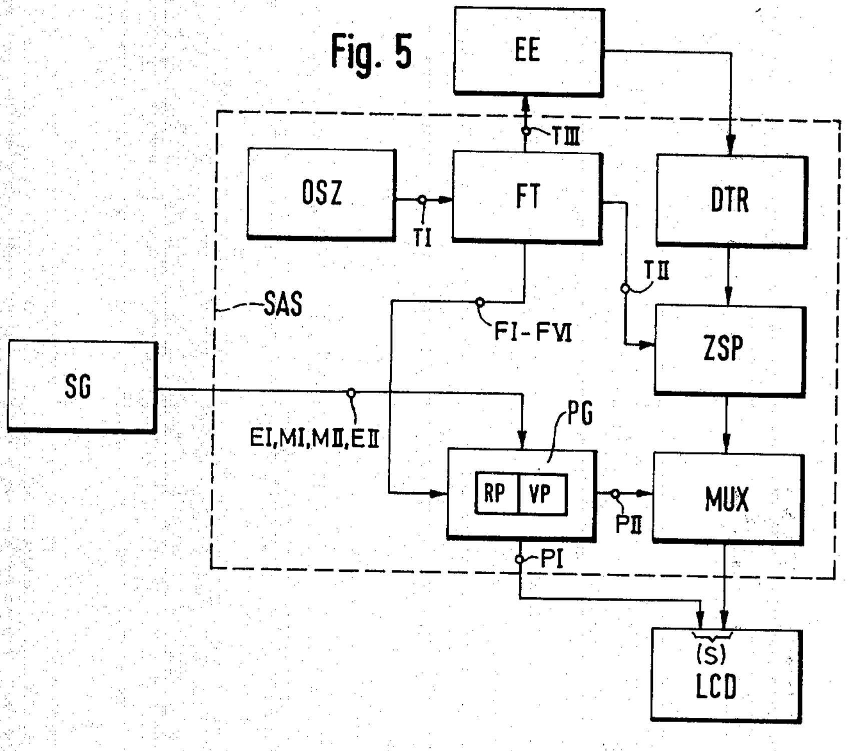
FIG. 5 illustrates a modified embodiment of the invention.

In FIG. 5 the signal preparation circuit SAS consists of an oscillator OSZ, a frequency divider FT, a pulse generator PG, a decoder driver DTR, an intermediate storage ZSP and the multiplexer MUX. The rhythmic pulses TI which are generated by the oscillator OSZ control the frequency divider which controls the input unit EE with rhythmic pulses TII, for example, at the frequency 1 HZ. Other outputs of the frequency divider FT generate, in effect, in synchronism with the control period SP, pulse sequences FI through FVI which are distinguished from each other through phase displacements of 1/6 of their period and which, during a time interval of 1/6 of their period, assume a voltage condition H and during 5/6 of their period another voltage condition L (see FIG. 6). Since the frequency divider is for this purpose equipped for a 1/6 division, at another output for the control of the intermediate storage ZSP, it delivers synchronizing pulses TII, the duration of which preferably consists of whole-digit multiple of the sextuple period duration of the synchronizing pulses TI (for example, a frequency of TI: 256 Hz; frequency of TII: 42.67 Hz). These pulse sequences FI through FVI will through a signal input control the pulse generator PG, whose other inputs are connected with the voltage generator SG and from which the outputs are connected with the multiplexer MUX and the display arrangement LCD. The input unit EE transmits binary-coded the information which is to be displayed in the rhythm TIII in the form of binary voltage pulses to the decoder-driver DTR, which decodes it into a normal seven-segment representation which reads into the intermediate storage ZSP from which there is further conveyed the information in rhythm TII to the multiplexer MUX, whereby the segments S which are selected therefor by the decoder-driver DTR are superimposed upon by the corresponding pulse sequences PII of the pulse generator PG.

Figure 7:
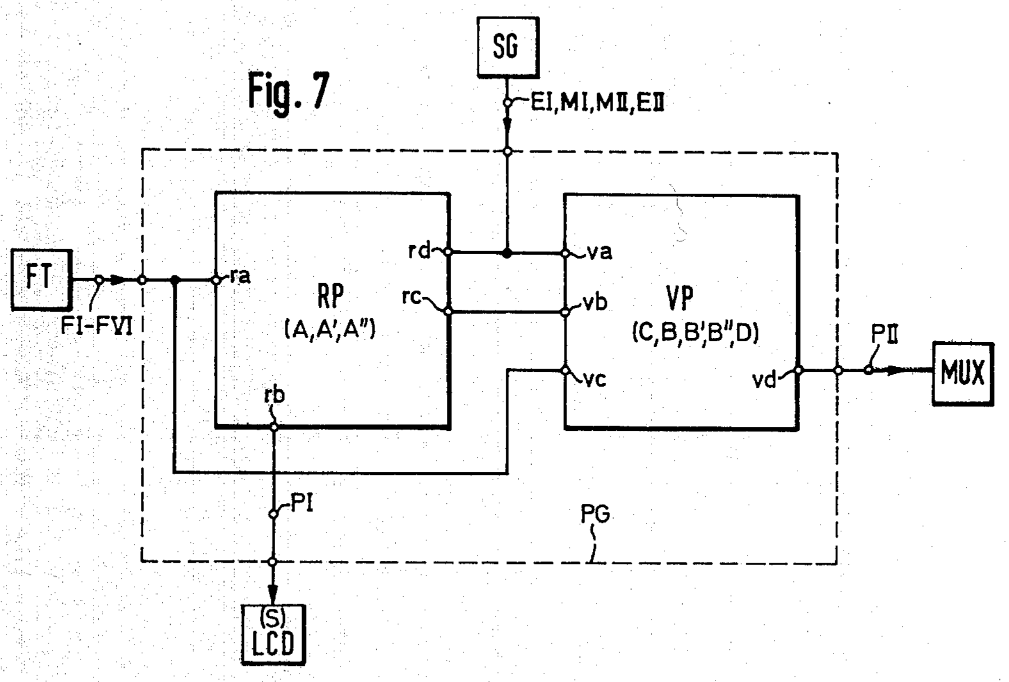
FIG. 7 is a view of the construction of a pulse generator pursuant to FIG. 5.

The generation of the, as previously described, inventively constructed and applied pulse sequences PI and PII in the pulse generator PG is described in closer detail hereinbelow. Pursuant to FIG. 7, the pulse generator PG contains a back electrode pulse generator RP and a forward electrode pulse generator VP which are supplied with control pulse sequences FI through FVI of the frequency divider FT through connectors rd and va, and from the voltage generator SG through connectors ra and vc, and connected with each other through connectors rc and rb. The forward and back electrodes pulse sequences PI and PII can be taken off at the outputs vd and rb.

Figure 8:
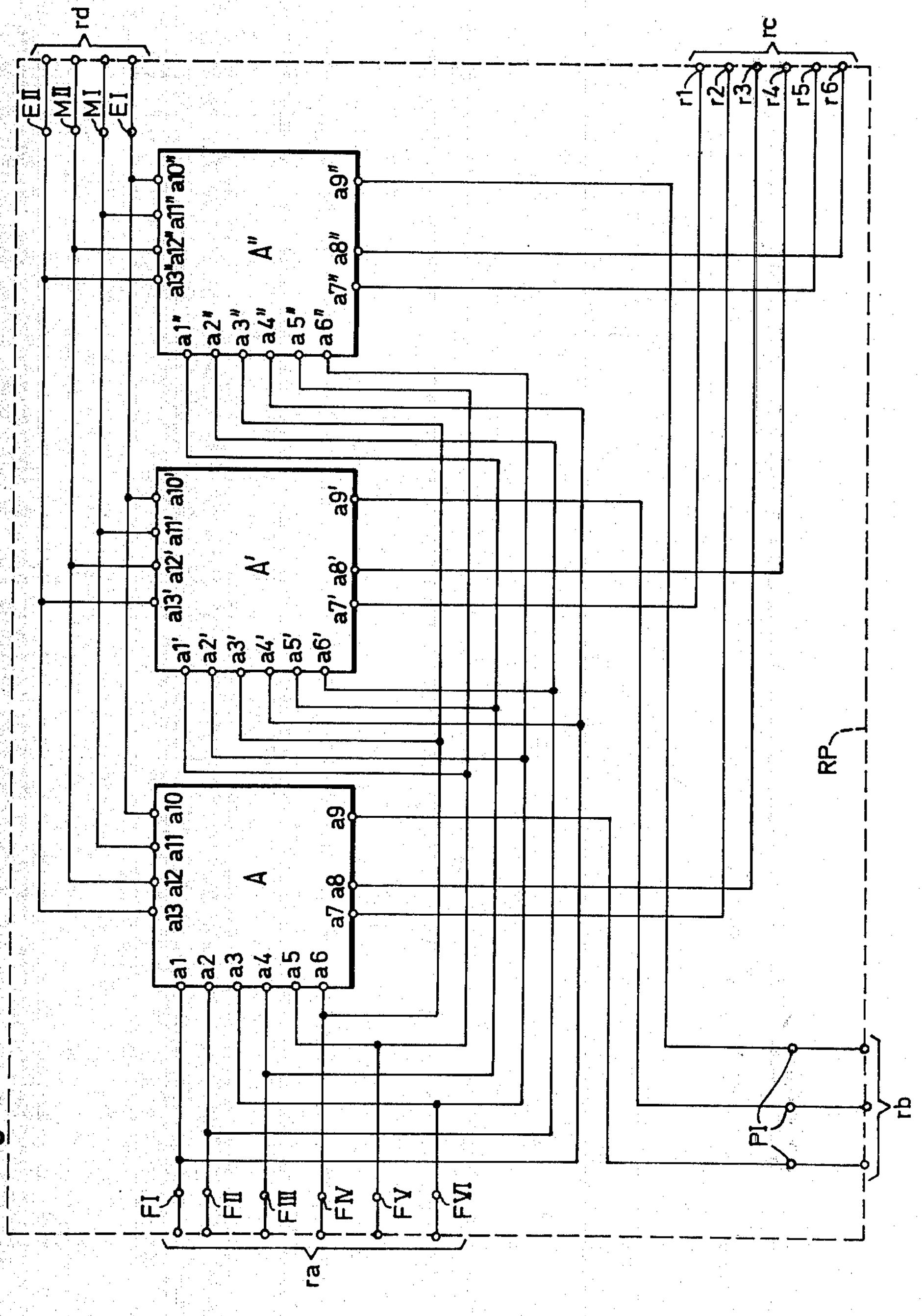
FIG. 8 is a current circuit diagram for a back electrode pulse sequence generator pursuant to FIG. 7.

The voltage circuit diagram shown in FIG. 8 is that for the back electrode pulse generator RP. It consists of three identical pulse generating switching circuits A, A', A", whose control inputs a1 through a6, a1' through a6', and a1" through a6" are controlled through the connectors ra by the control pulse sequences FI through FVI (see FIG. 6). Consequently, at the connector rb there appears the three back electrode pulse sequences PI, as described hereinbelow.

Figure 9:
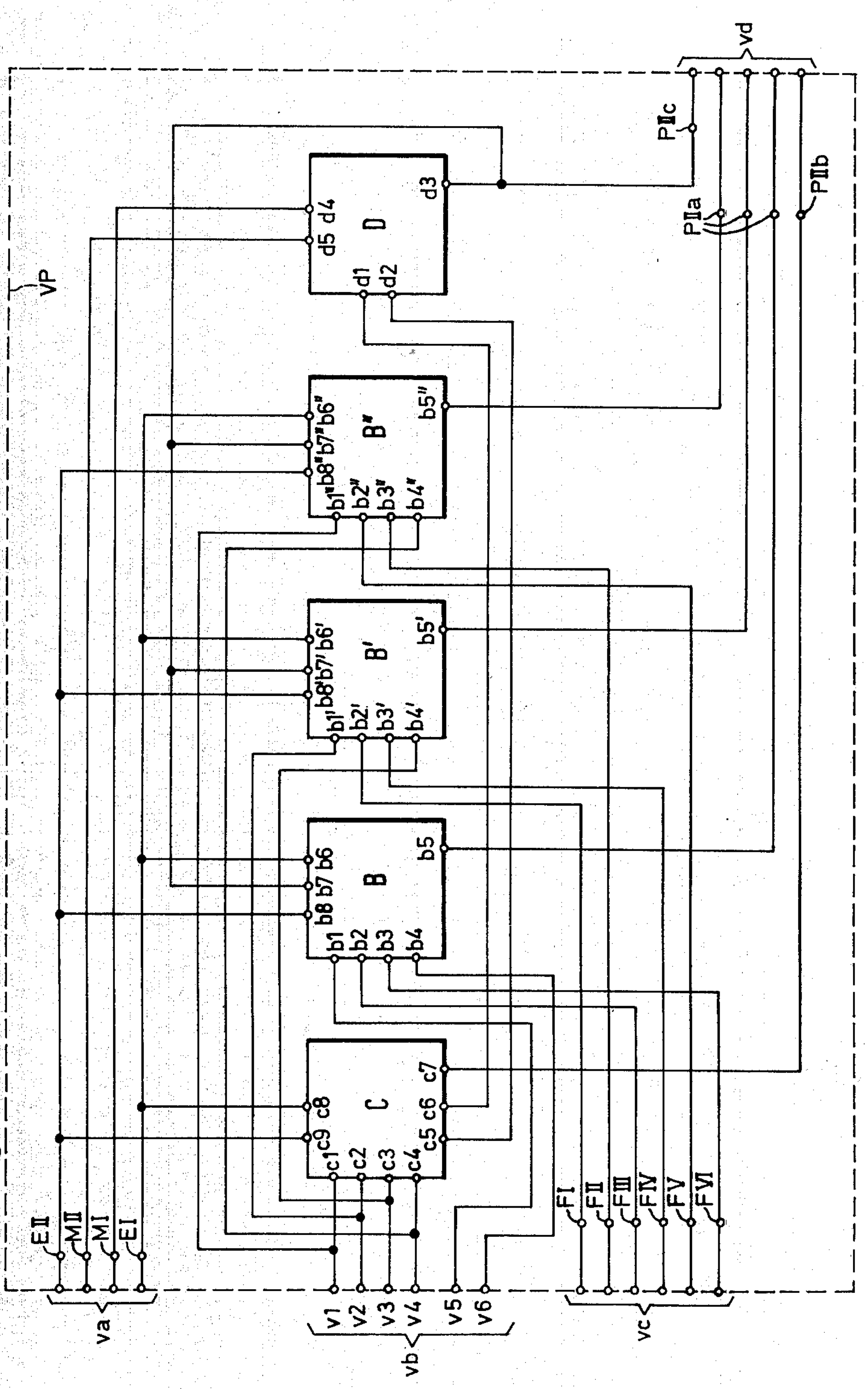
FIG. 9 is a current circuit diagram for a forward electrode pulse sequence generator pursuant to FIG. 7.

According to FIG. 9, the forward electrode pulse generator VP consists of five pulse generating switching circuits B, B', B", C and D, whereby three identical switching circuits B, B' and B" generated pulse sequences PIIa which are identical up to phase displacements. Each of the switching circuits B, B' and B" are controlled by the control signals FI through FVI whereby there are again generated the pulse sequences PIIa.

Figure 10A:
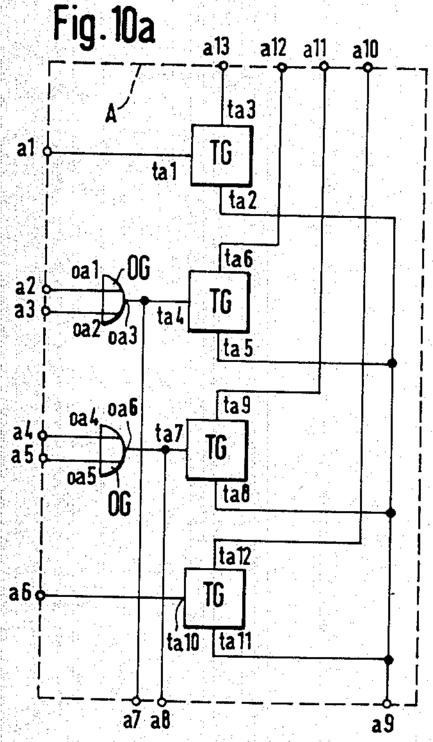
FIGS. 10*a*, *b*, *c*, and *d* each show current circuit diagrams for the pulse generating switching circuits pursuant to FIGS. 8 and 9.

Pursuant to FIG. 10*a*, each of the pulse generating switching circuits A includes four transmission gates TG, whose outputs ta2, ta5, ta8 and ta11 are switched commonly to the switching circuit output a9, and whose inputs ta3, ta6, ta9 and ta12 are switched individually to the four switching circuit inputs a13, a12, a11 and a10, which are subjected through the connector rv with the voltage levels EI, MI, MII and EII. Two control inputs ta1 and ta10 of two transmission gates TG are directly connected with the switching circuit to control inputs a1 and a6. Two control inputs ta4 and ta7 of the two other transmission gates TG are connected with the outputs oa3 and oa6 of two dual-OR gates OG and with two switching circuit connections a7 and a8, whereby the connectors a7, a8 supply power through the connector rc to the forward electrode pulse generator VP (see FIG. 7). Hereby, there is achieved a simplification of the circuitry in that the same OR interconnections occur only once, in essence, need not again be duplicated for the forward electrode pulse generator. The connectors rc and vb (FIGS. 8 and 9) between the back electrode pulse generator RP and the forward electrode pulse generator VP includes the connectors r1 through r6 and v1 through v6, which are connected with each other in the indicated series sequence. The inputs oa1, oa2 and oa4, oa5 of the two OR gates OG are connected with the switching circuit control inputs a2, a3 and a4, a5.

Figure 10B:
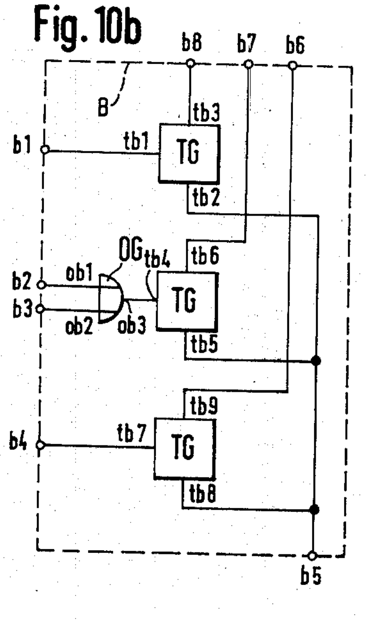

Pulse generating switching circuit B, pursuant to FIG. 10*b*, has three transmission gates PG, whose outputs tb2, tb5 and tb8 are connected in common with the switching circuit output b5, and whose three inputs tb3, tb6 and tb9 are connected individually to the three switching circuit inputs b8, b7 and b6, whereby two transmission gate control inputs tb1, tb7 are connected directly with the switching circuit control inputs b1, b4, and a transmission gate control input tb4 with an output ob3 of a dual-OR gate OG, whose inputs ob1 and ob2 are connected to the switching circuit inputs b2 and b3.

The pulse generating switching circuits C and D serve in a corresponding manner for the generation of the pulse sequences PIIb and PIIc.

Figure 10C:
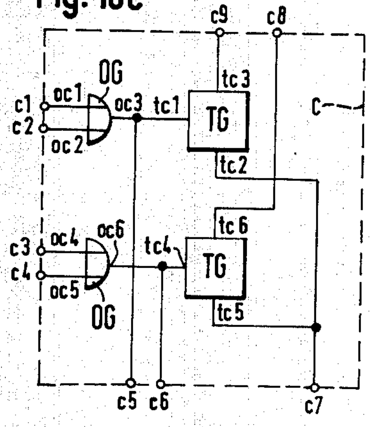

The switching circuit C, pursuant to FIG. 10*c*, has two transmission gates TG whose outputs tc2 and tc5 are connected in common to the switching circuit output c7 and whose two inputs tc3 and tc6 are individually connected to two switching circuit inputs c9 and c8, whereby two transmission gates control inputs tc1 and tc4 are connected with outputs oc3 and oc6 of two dual-OR gates OC and with the switching circuit connections c5 and c6, and whereby inputs oc1, oc2 and oc4, oc5 of the two OR gates OG are connected to switching circuit inputs c1 through c4.

Figure 10D:
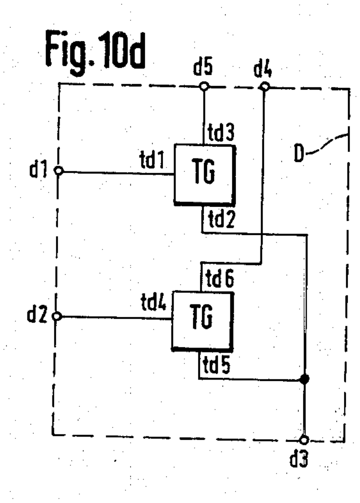

The switching circuit D, pursuant to FIG. 10*d*, has two transmission gates TG whose outputs td2 and td5 are connected in common to the switching output d3 and whose two inputs td3 and td6 are connected to two switching circuit inputs d5 and d4, whereby two transmission gate control inputs td1 and td4 are connected directly with switching circuit control inputs d1 and d2. This switching circuit d4 does not include an OR gate since the functionally required OR interconnections have already been effectuated in other switching circuits and can be utilized for this purpose, as can be ascertained from the input circuitry of the switching circuit input d1 and d2 in FIG. 9.

The switching circuit connections b1 through b8, b1' through b8', b1" through b8", c1 through c9 and d1 through d5 of the switching circuits b, b', b", c and d (FIG. 10*b* through *d*) are correspondingly connected, pursuant to the previous constructions, to the switching circuit A (see FIGS. 8 and 10*a*) with the connectors va through vd of the forward electrode pulse generator VP (see FIG. 9).

The mode of operation of the pulse generator PG is predicated on that the pulse generating switching circuits, for example, A, B, C and D, are connected at their control inputs, for example, a1 through a6, b1 through b4, c1 through c4 and d1, d2 to the control pulse sequences FI through FVI either directly or interengaged with each other through OR gates. At each of the further inputs, for example, a10 through a13, b6, b8, c8, c9 and d4, d5, there is present one of the four voltage levels, EI, MI, MII, and EII as indicated in FIGS. 8 and 9. In order to minimize the number of conductors there is further provided an input, for example, b7, which is supplied not constantly, but in a switched manner, in effect with the output signal at d3 (see FIG. 9).

Figure 6:
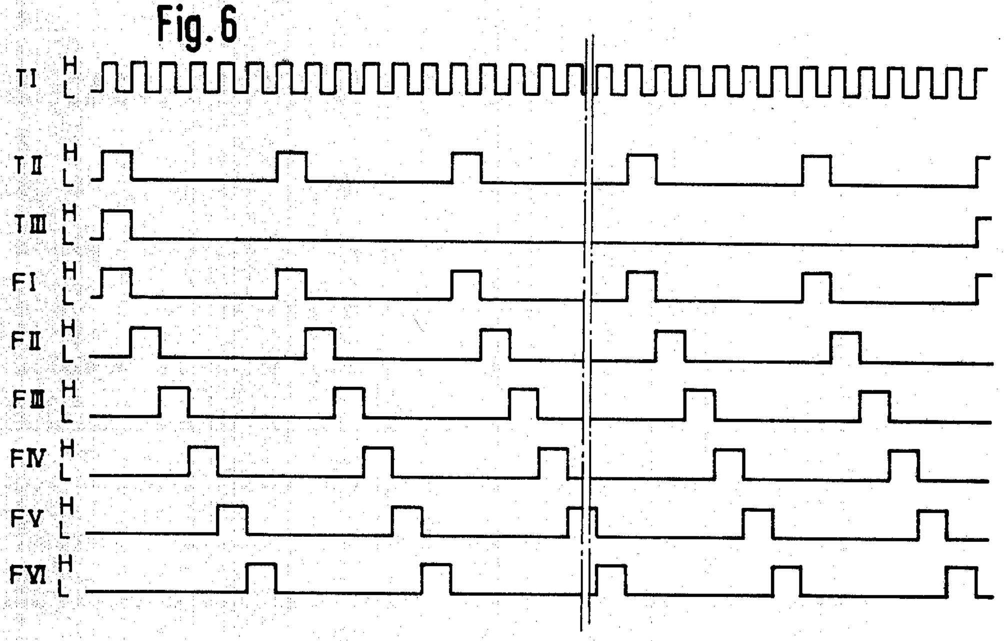
FIG. 6 is a representation of rhythmic and control pulse sequences pursuant to FIG. 5.

By way of example, there is now described the generation of the first pulse sequence of the back electrode pulse sequences PI illustrated in FIG. 1. At the commencement of the control period SP (see FIG. 1), through the control input a1 of the switching circuit A (see FIG. 8) there is applied a control pulse FI (see FIG. 6) to the control input ta1 of the transmission gate TG (see FIG. 10*a*) so as to thereby connect the voltage level b2 at the input a13 with the output a9. After a time interval of 1/6 of the control period SP, the control pulse FI is switched from the voltage condition H into the voltage condition L (see FIG. 6), and thereby the input a13 is disconnected from the output a9 and concurrently the control pulse FII is switched to the voltage condition H, in essence, is applied through the input a2 and the OR gate OG of the control pulse FII (see FIG. 8) to the control input ta4 of the transmission gate TG (see FIG. 10*a*), and thus the voltage level MII is now applied to the same output a9. In a corresponding manner there are subsequently sequentially connected the voltage levels MI, EI and EII to the output a9, in effect, here appears the first pulse sequence of the back electrode pulse sequence group PI (see FIG. 1). In this pulse sequence, the level MII appears at the times when the control pulses FII or FVI assume the voltage condition H (FIG. 6). Accordingly, the control pulses FII and FVI are conducted through the inputs oa1 and oa2 of the OR gate OG to the input ta4 which this level MII applies to the output a9 switching the transmission gate TG.

In a corresponding manner can there be generated various other pulse sequences PI, PII, whereby the number of the control impulses FI through FVI interconnected with each other through the OR connections corresponds to the occurence of the same voltage stages EI, MI, MII and EII during a control period SP of the present pulse sequence.

Figure 11:
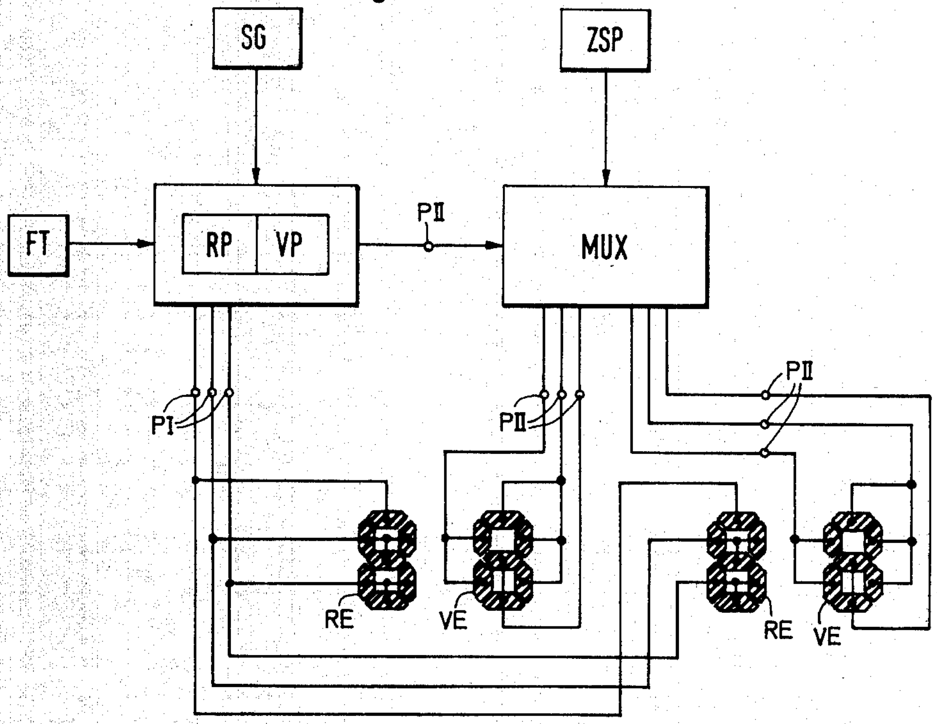
FIG. 11 is a current cycle diagram for the control of the forward and back electrodes of two seven-segment displays.

Illustrated in FIG. 11 is a voltage circuit diagram for the control of the forward and back electrodes VE and RE of two seven-segment displays. Hereby, each of the three back electrode pulse sequences PI is located at the same back electrode RE of each seven-segment display. The forward electrode pulse sequences PII are switched through the multiplexer MUX pursuant to the kind of indicia which is to be represented to the forward electrodes VE.

Illustrated in FIG. 12 is a representation pursuant to FIG. 11, which can be utilized for the control of special indicia SO, in this instance, a period and an arrow.

What is claimed is:

1. In a process for the three step-multiplex control of electro-optical display arrangements which include segmented forward and back electrodes, effecting said control through periodic pulse sequences which include six pulses within one control period and which can presently assume four different voltage levels, three of said pulse sequences being constantly connected to back electrodes and the other pulse sequences being connected to forward electrodes pursuant to indicia being represented; the improvement comprising: said three pulse sequences connected to the back electrodes being identical to each other during a time interval but being phase-displaced relative to each other by one-third of the control period, said three pulse sequences rising and falling in uniform sequential equal steps being extreme voltage level values; at least five pulse sequences being provided for said forward electrodes for actuation thereof, three of said last-mentioned pulse sequences being identical to each other during a time interval but being phase-displaced relative to each other by one-third of the control period and having alternatingly opposite paired extreme voltage level values, each said pair being separated through a voltage level deviating by a level step from its extreme values and of which two further pulse sequences are binary pulse sequences having a pulse sequence period of one-third of the control period, one said binary pulse sequence alternating between the two extreme values and the other binary pulse sequence alternating between the two other level stages.

2. Process as claimed in claim 1, comprising controlling said forward electrodes with three pulse sequences for the representation of special indicia, said pulse sequences distinguishing from the three pulse sequences connected to the back electrodes through a phase displacement of 1/6 of the control period.

3. In a three step-multiplex control circuit for the control of electro-optical display arrangements including segmented forward and back electrodes, said control being effected through periodic pulse sequences which include six pulses within one control period and which can presently assume four different voltage levels, three of said pulse sequences being constantly connected to back electrodes and the other pulse sequences being connected to forward electrodes pursuant to indicia being represented; the improvement comprising: a signal preparation circuit generating the forward and back electrode pulse sequences for controlling said display arrangement; a voltage generator having four voltage levels being connected with said signal preparation circuit; and an input unit rhythmically supplying power to said voltage generator with binary voltages.

4. Control circuit as claimed in claim 3, said signal preparation circuit comprising a logic circuit connected with a programmable storage circuit, said programmable storage circuit being connectable with said input unit and said logic circuit being connectable with the voltage generator and the display arrangement.

5. Control circuit as claimed in claim 4, said logic circuit comprising a shift register, a pulse generator for generating the forward and back electrode pulse sequences, and a multiplexer.

6. Control circuit as claimed in claim 3, said signal preparation circuit generating six equal binary control pulse sequences in the synchronism of a control period, said pulse sequences being phase-displaced relative to each other by 1/6 their period and assuming within the time interval a first voltage condition during 1/6 their period and a second voltage condition during 5/6 their period, a pulse generator being connected with said voltage generator and receiving said control pulse sequences, said pulse generator including transmission gates selectively controllable directly or through OR connections from said control pulse sequences, each said transmission gate in the actuated controlled condition thereof switching in one of four voltage levels at its output and wherein, for the generation of forward and back electrode pulse sequences, the output of a plurality of said transmission gates are switched together, the back electrode pulse sequences being connected with the back electrodes of the display arrangement; a multiplexer being powered by the forward electrode pulse sequences; an intermediate storage having selected pulse sequences corresponding to the information to be represented switched by said multiplexer to the forward electrodes of said display arrangement; a decoder-driver being connected to the input of said intermediate storage so as to be subjected to binary coded voltage pulses from the input unit.

7. Control circuit as claimed in claim 6, comprising a synchronizing oscillator; and a frequency divider being connected to the output of said oscillator, control pulse sequences being phase-fixedly received from said frequency divider, and rhythmic pulses for the control of said input unit being received from said frequency divider so as to deliver intermediate storage synchronizing pulses.

8. Control circuit as claimed in claim 6 or 7, said pulse generator for the generation of each of the forward and back electrode pulse sequences combining such a number of control pulse sequences through OR connections whereby this number corresponds to the number of the same level stages of this pulse sequence so that each OR connection present is formed only once.

9. Control circuit as claimed in claim 8, said pulse generator including four different, mutually interconnected pulse generating switching circuits whereby the pulse sequences which differ only in phase displacement relative to each other are generated by identical pulse generating switching circuits controlled offset in time in conformance with the phase displacement.

* * * * *